April 11, 1939.  I. B. WHINERY  2,153,950
KNOB ATTACHING DEVICE
Filed July 19, 1937
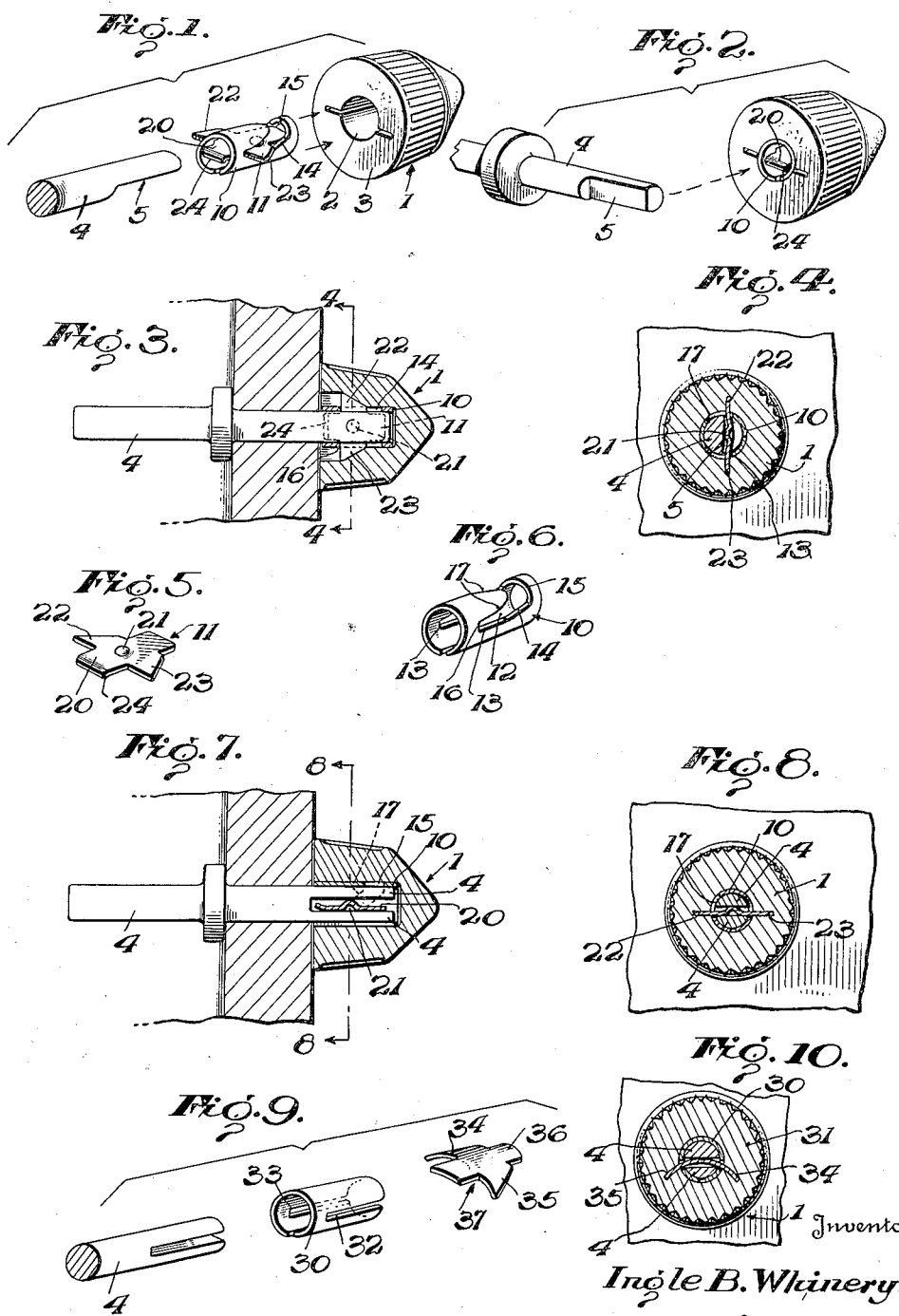
Inventor
Ingle B. Whinery.
By Samuel Scrivener Jr.
Attorney Patented Apr. 11, 1939

2,153,950

UNITED STATES PATENT OFFICE 2,153,950

KNOB ATTACHING DEVICE

Ingle B. Whinery, East Grand Rapids, Mich., assignor to Waddell Manufacturing Company, Grand Rapids, Mich., a corporation of Michigan Application July 19, 1937, Serial No. 154,517

9 Claims. (Cl. 287—53)

This invention relates, broadly, to devices for joining together two separate parts which are to be operated as a unit and, more particularly, relates to devices for attaching a knob to a shaft which is to be rotated by a turning movement of the knob.

An object of this invention is to provide an attaching device for the purpose stated which will embody means whereby the device is rigidly attached to the knob, and also means whereby the device resiliently engages the shaft.

Another object of the invention is to provide a device for attaching the flattened or slotted end of a shaft to a knob, such device being rigidly attached to the knob and being capable of turning movement therewith, and positively engaging the shaft in order that undesired relative movement between the knob and the shaft is prevented.

A further object is to provide a device of the character described which will include a flat or slightly curved member which may be attached within an opening in the knob in such a position that it will engage a portion of a shaft which is inserted into the knob opening, to thereby effectively attach together the knob and the shaft.

A further object of the invention is to provide a device for attaching a knob to a shaft which will include a minimum number of parts, which may be cheaply and easily manufactured, but which will be efficient in operation, said device providing the necessary and desired attachment between the knob and the shaft.

Other objects and features of novelty will be apparent from the following description and the annexed drawing, it being clearly understood, however, that such description and drawing are only illustrative of the invention, which is not limited thereby or otherwise than by the appended claims.

Referring to the drawing, in which similar reference numerals refer to like parts:

Fig. 1 is an exploded view illustrating a knob, a shaft and an attaching device therefor, these parts being in position to be assembled;

Fig. 2 is a view showing a knob and shaft ready for assembly, the knob having attaching means according to this invention associated therewith;

Fig. 3 is a sectional view showing a knob, shaft and attaching means in assembled relation;

Fig. 4 is a sectional view taken on the line 4—4 of Fig. 3;

Fig. 5 is a perspective view of one element of an attaching device according to this invention;

Fig. 6 is a perspective view of a second element of an attaching device and adapted to be used in co-operation with the device of Fig. 5;

Fig. 7 is a view, similar to Fig. 3 and illustrating the use of an attaching device according to this invention in connecting a knob to a slotted shaft;

Fig. 8 is a sectional view taken on the line 8—8 of Fig. 7;

Fig. 9 is an exploded view illustrating a second form which the attaching device according to the invention may take, and Fig. 10 is a sectional view, similar to Fig. 4 and showing a knob and shaft connected by means of the attaching device of Fig. 9.

By the present invention a simple and efficient device for attaching a knob to a shaft or for attaching together any two parts which are to be operated as a unit has been provided. While this invention may be applicable for attaching any type of shaft of any cross-sectional shape or construction whatsoever, to a knob of any type or description, the invention is intended to be particularly used for the attachment of a knob having an aperture therein to a shaft having a flattened end or having a slot formed in the end thereof which end portion of the shaft is to be received within the aperture in the knob. One form of a device of this type is illustrated in Figs. 1 to 8 of the drawing and it will be seen that the same comprises a device of generally flat configuration which is disposed within a cylindrical structure, the whole assembly being adapted to be inserted within an aperture in the knob and to be rigidly attached therein in such a manner that the flat portion of the device extends across the aperture in the knob as a chord or diameter thereof. Referring to Figs. 1 to 8 of the drawing, there is disclosed therein a knob 1 which may be formed of any suitable material and of any size or shape and which is provided with a preferably cylindrical aperture 2 which extends axially of the knob. This aperture extends inwardly from the inner face 3 of the knob and terminates between such face and the outer surface of the knob, being of such depth as to receive a suitable length of the end of the shaft. This knob is adapted and intended to be resiliently but securely attached to a shaft 4, the end portion of which, for a suitable distance, may be slotted, as hereinafter described, or may be cut away as at 5 to provide a flat face extending for a suitable distance along the length of the shaft from the end thereof. The diameter of the shaft is preferably approximately the same as the internal diameter of the tubular portion of the attaching device, to be described hereinafter, in order that the end of the shaft may be received within said device without looseness. The external diameter of the tubular member of the attaching device, to be described hereinafter, is substantially the same as the internal diameter of the aperture in the knob in order that such cylindrical portion of the attaching device may be securely received within the aperture in the knob.

Means are provided by the invention for resiliently and frictionally attaching the knob to the shaft in such a manner that a firm but slightly yielding attachment between these two elements will be provided. Such a device is clearly illustrated in the drawing and it will be seen that the device comprises a cylindrical body portion 10 which, when the device is in position in the aperture in the knob, extends axially of the knob as clearly disposed in Fig. 2, and a second, flat portion 11 which extends across the aperture in the knob as a chord or diameter thereof.

The cylindrical member 10 of the attaching device may be formed from a single piece of sheet metal or from any other suitable material. Formed in this cylindrical member is an aperture 12 which is adapted to receive the flat member 11 of the attaching device in a manner to be described hereinafter. The aperture 12 extends in a generally diagonal direction across the cylindrical bushing, the opposite walls of the bushing being cut away in similar manners to form the aperture. The lower or inner faces 13 of the aperture are flat and extend parallel to the axis of the bushing. From these parallel faces or edges the walls of the aperture extend in one direction at an acute angle to the axis of the bushing, as at 14, and then circumferentially of the bushing as at 15. From the other end of the axial edges or faces 13 the walls of the aperture extend circumferentially, as at 16, and then at acute angles to the axis of the bushing, as at 17. Between the edges 17 and the circumferential edge 15, the material of the bushing is cut away, leaving an opening 18 in the wall of bushing through which the flat member 11 may be inserted into the aperture described.

The flat or spring member 11 of the attaching device is of generally cruciform shape, having a generally elongated body portion 20 which, when the attaching device is assembled, is adapted to lie within and extend axially of the cylindrical bushing 10. One or both of the ends of the body portion may be turned slightly, as illustrated at 24, in order to facilitate the insertion of a shaft into the attaching device, as will be pointed out fully hereinafter. Formed in the central portion of this body portion is a raised or deformed portion 21 which extends upwardly out of the plane thereof for a purpose to be described. Extending laterally from the sides of the body portion are wing or cutting members 22, 23 which are provided with inclined cutting faces. When the attaching device is assembled, the wing members 22, 23 are adapted to extend through the apertures in opposite walls of the cylindrical member and rest upon the flat, axial faces or edges 13, thereby supporting the body portion of the flat member in position within the cylindrical bushing. The entire attaching device is clearly disclosed in assembled condition in Fig. 1 of the drawing, and it will be seen that the body portion is disposed within and axially of the cylindrical portion and forming a chord or diameter thereof when the device is viewed from the end.

In the operation and use of the device the same is positioned adjacent and in alignment with the aperture in the knob. In this position the cylindrical member 10 with the flat portion 11 placed in its proper position within the same is forced into the aperture in the knob. The cylindrical member is received securely within the aperture 2, causing the flat portion 11 to enter into the aperture as a chord or diameter thereof. The wing members 22, 23 of the body portion 20 cut into the material of the knob at opposite sides of the knob opening, or may be received within pre-formed openings in the knob. The device is driven into the knob opening until the end of the cylindrical member is in the plane of the inner face 3 of the knob, as illustrated in Fig. 2. If the flattened or slotted end of the shaft is now inserted into the opening in the knob, it will be seen that the flat portion or slot thereof will be engaged in face-to-face contact with the body portion 20, of the flat element of the attaching device. The cylindrical portion of the flattened or slotted end of the shaft will engage the inner surface of the cylindrical member 10 and will be forced into tight and binding engagement with such surface by the resilient engagement between the flat face of the shaft and the body portion 11 of the attaching device. The introduction of the end of the shaft into the cylindrical bushing will be facilitated by the inclined surface 24 which is formed on the end of the body portion. The friction between the shaft and the body portion will be increased by reason of the engagement of the shaft with the raised portion 21 of the body member 20, such engagement causing the body portion of the member 10 of the attaching device to bow slightly as illustrated in Fig. 3.

It will be apparent that the attaching device provided by this invention will be operative to resiliently force the end of the shaft into binding engagement with the interior wall of the tubular structure and that removal of the knob from the end of the shaft will be resisted by frictional contact between the cylindrical surface of the end of the shaft and the interior cylindrical surface of the tubular member, which is forced against the inner wall of the aperture in the knob, and between the flattened or slotted end of the shaft and the flat face of the body portion of the attaching device. Such frictional engagement will not, however, be sufficient to prevent the removal of the knob from the shaft if this is desired, and such removal may be effected by merely pulling the knob from the end of the shaft. Such frictional engagement will, however, be sufficient to prevent undesired or accidental removal of the knob from the shaft.

In Figs. 7 and 8 there is illustrated the attachment of a knob to a slotted shaft by means of an attaching device as hereinbefore described. A slot is formed in the end of this shaft, preferably extending diametrically thereof and for any desired distance along the length of the shaft. When such a shaft is positioned within the cylindrical portion 10 of the attaching device, the outer walls of the shaft will engage the inner surface of the cylindrical member 10, while the flat body portion 11 of the attaching device will be received within the slot formed in the end of the shaft, thereby causing the releasable attachment of the knob to the shaft in the manner hereinbefore described.

In Figs. 9 and 10 of the drawing there is disclosed a somewhat modified form of the invention. In this embodiment there is provided a cylindrical bushing member 30 which has the same function as the similar member 10 hereinbefore described and which is adapted to be tightly received within a cylindrical aperture formed in a knob 31. The bushing member 30 is provided with two parallel slots 32, 33 both of which extend axially of the bushing and which may be spaced in diametrically opposed portions of the bushing or may be separated, on their one sides, by less than one-half of the circumference of the bushing, as illustrated in the drawing. Each of these apertures preferably extends from one end of the bushing to a point adjacent the other end thereof.

This attaching device includes a second member which is denoted generally at 35 and which comprises a spring metal member of generally cruciform shape and which is curved in cross-section. This member comprises a body portion 36 which is adapted to lie within and extend axially of and across the bushing member 30. Extending from the lateral sides of the body portion are wing or cutting members 34, 35 which are preferably of the same general configuration as the wing or cutting members 22, 23 described hereinbefore. These wing members are adapted to extend through the slots 32, 33 when the attaching device is in assembled position, thereby supporting the body portion 36 within the bushing.

It will be seen that when the described attaching device has been assembled, the bushing, with the curved resilient body member therein, may be driven into the aperture in a knob, the wing members cutting into the material of the knob and securely attaching the entire device within the knob opening. In this position the body portion 36 will extend in a curved arc across the aperture in the knob and across the bushing lining the same, in such a manner that if the end of a shaft is inserted into the bushing it will be resiliently but firmly engaged by the curved body member of the device and securely held within the knob opening. Obviously the device may be employed to attach a milled shaft, a slotted shaft or a shaft of whatever shape or configuration within the knob opening and will firmly but releaseably and resiliently attach the knob to the shaft. For the purposes of illustration the device is illustrated in Fig. 10 as attaching together a knob and a slotted shaft, but it will be understood that this disclosure is merely illustrative of the invention, and that the same may be used to attach a knob to a milled shaft or to a shaft of any other cross-sectional shape or formation.

It will be apparent that it may be desirable or necessary to position the portion 11 or 35 of the attaching device in different positions with respect to the knob opening in order to accommodate shafts having different end configurations or formations. For example, when in use with a slotted shaft, as illustrated in Figs. 7, 8 and 10 this member is preferably positioned in such a manner that it extends diametrically of the knob opening, while when used with a milled shaft, as illustrated in Fig. 4, it may be desirable to position such member to one side or necessary of a diameter of the knob opening. Any such variation may be practised without departing in any way from the scope of the invention.

While I have described and illustrated only a single embodiment of my invention, it will be apparent to those skilled in the art that various modifications thereof may be made, that improvements in this device may be effected, and that the particular form and arrangement of the various parts of the attaching device may be varied within wide limits, all without departing in any way from the scope of the invention. It will also be seen that this device may be adapted for the attachment of knobs to shafts which are not provided with flattened end portions. Further in this connection, it is to be understood that reference in the description and claims to a shaft having a flat portion formed thereon is not to be understood as limiting the invention or such claims to any particular type of shaft. Obviously, and as clearly described, the invention may be employed with any milled, slotted or undeformed shaft, and the invention and all claims thereto are to be so construed. All of these various modifications and improvements, as well as many others, are fully within the scope of the invention, for the limits of which reference must be had to the appended claims.

What I claim is:

1. A device for attaching a cylindrical shaft having a flat surface formed on the end thereof within an opening in a knob, comprising a cylindrical member adapted to be received within the knob opening and adapted to receive and engage the cylindrical portion of the end of the shaft, and a separate flat member disposed within said cylindrical member and being adapted to engage the flat surface of the end of the shaft to thereby attach the shaft within the knob opening, said flat member having a raised portion formed thereon and adapted to engage the flat surface formed on the end of the shaft to thereby cause a tighter frictional engagement between the flat member and the shaft.

2. A device for attaching a shaft having a flat surface formed on the end thereof within an opening in a knob, comprising a cylindrical member adapted to be received in and line the knob opening and having apertures formed in the opposite sides thereof, and a curved member formed of spring metal and being disposed within the cylindrical member and extending across the same, said curved member having wing portions extending from the lateral sides thereof and extending through the apertures in the cylindrical member and being adapted to engage the material of the knob to attach said flat member to the knob.

3. A device for attaching a shaft having a flat surface formed on the end thereof within an opening in a knob, comprising a cylindrical member adapted to be received in and line the knob opening and having apertures formed in the opposite sides thereof, and a member formed of spring metal and being disposed within the cylindrical member and extending across the same, said flat member having wing portions of lesser area than said flat member extending from the lateral sides thereof and extending through the apertures in the cylindrical member and being adapted to engage the material of the knob to attach said flat member to the knob, each of said wing members having inclined cutting edges formed thereon.

4. A device for attaching a shaft having a flat surface formed on the end thereof within a knob having an opening therein, comprising a cylindrical member adapted to be received within and line the knob opening, said cylindrical member having an aperture formed therein extending circumferentially of the bushing and of lesser length than the entire circumference of the bushing, and being terminated at circumferentially-spaced points by flat, parallel edges which extend longitudinally of the cylindrical member, and a member formed of spring material disposed within said cylindrical member and extending longitudinally thereof and across the same, and wing members connected to the lateral sides of said flat member and extending through the apertures in said cylindrical member and resting upon said flat, parallel, circumferentially-spaced edges, said wing members being adapted to engage the material of the knob to thereby attach the flat member to the knob.

5. A device for attaching a shaft having a flat surface formed on the end thereof within a knob having an opening therein, comprising a cylindrical member adapted to be received within and line the knob opening, and adapted to receive and engage the cylindrical portion of the end of the shaft, said cylindrical member having an aperture formed therein between the ends thereof which extends circumferentially of the bushing and is of lesser length than the entire circumference of the bushing, and which is terminated at circumferentially-spaced points by flat, parallel edges which extend longitudinally of the cylindrical member, and a flat member formed of spring material disposed within said cylindrical member and extending longitudinally thereof and across the same as a chord thereof and being adapted to engage the flat surface on the end of the shaft, and wing members integrally connected to the lateral sides of said flat member and extending through the apertures in said cylindrical member and resting upon said flat, parallel, circumferentially-spaced edges, said wing members being adapted to engage the material of the knob to thereby attach the flat member to the knob.

6. In combination, a knob having an opening therein, a shaft having an end portion adapted to be received within the knob opening and having a flat surface formed thereon and extending longitudinally thereof, a cylindrical bushing member lining the knob opening, a resilient member disposed within said bushing and extending longitudinally of said bushing and across the same as a chord thereof and having a down-turned lip portion formed at the end thereof adjacent the entrance to the knob opening for facilitating the insertion of the end of the shaft into the knob opening, the inner surface of said bushing member being adapted to engage the cylindrical surface on the end of the shaft and the resilient member being adapted to engage the flat surface of the end of the shaft, said resilient member being so constructed and arranged as to cause said member to flex out of its normal position when engaged by the flat surface of the end of the shaft to thereby attach the knob to the shaft.

7. A device for attaching a shaft within an opening formed in a knob, comprising a device formed of sheet metal and being of cruciform shape to provide a body portion and wing members extending from the sides thereof, said body portion being adapted to extend as a chord across a knob opening into which said device is inserted in order to engage a shaft inserted in such opening and being so constructed and arranged as to cause said body portion to flex out of its normal position when engaged by a shaft, said wing members being adapted to engage the material of a knob with which the device is associated to thereby securely attach the device to the knob.

8. A device for attaching a shaft within an opening formed in a knob, comprising a device formed of sheet metal and being of cruciform shape to provide a body portion and wing members extending from the sides thereof, said body portion being adapted to extend as a chord across a knob opening into which said device is inserted in order to engage a shaft inserted in such opening and being provided with a struck-up portion extending out of the plane of the body portion and adapted to cause said body portion to flex out of its normal position when engaged by a shaft, said wing members being adapted to engage the material of a knob with which the device is associated to thereby securely attach the device to the knob.

9. A device for attaching a shaft within an opening formed in a knob comprising a device formed of sheet metal and being of cruciform shape to provide a body portion and wing members extending from the sides thereof, said body portion being adapted to extend as a chord across a knob opening into which said device is inserted in order to engage a shaft inserted in such opening and being curved in cross-section to provide means for causing said body portion to flex out of its normal position when engaged by a shaft, said wing members being adapted to engage the material of a knob with which the device is associated to thereby securely attach the device to the knob.

INGLE B. WHINERY.